US010050766B2

(12) United States Patent
Takeda et al.

(10) Patent No.: US 10,050,766 B2
(45) Date of Patent: Aug. 14, 2018

(54) USER TERMINAL, BASE STATION, AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/024,702

(22) PCT Filed: Sep. 19, 2014

(86) PCT No.: PCT/JP2014/074942
§ 371 (c)(1),
(2) Date: Mar. 24, 2016

(87) PCT Pub. No.: WO2015/046089
PCT Pub. Date: Apr. 2, 2015

(65) Prior Publication Data
US 2016/0241377 A1    Aug. 18, 2016

(30) Foreign Application Priority Data
Sep. 26, 2013  (JP) ................................. 2013-200353

(51) Int. Cl.
*H04L 5/14*       (2006.01)
*H04W 72/04*    (2009.01)
(Continued)

(52) U.S. Cl.
CPC .................. *H04L 5/14* (2013.01); *H04L 1/18* (2013.01); *H04L 5/001* (2013.01); *H04L 5/0055* (2013.01);
(Continued)

(58) Field of Classification Search
CPC . H04L 5/14; H04L 1/18; H04L 5/0055; H04L 5/001; H04W 72/044; H04W 72/042; H04W 72/0413; H04W 72/04
See application file for complete search history.

(56) References Cited

U.S. PATENT DOCUMENTS

2014/0153449 A1*  6/2014  Seo ........................ H04L 1/1607
                                                            370/280
2014/0334395 A1* 11/2014  Lee ........................ H04L 5/0053
                                                            370/329

FOREIGN PATENT DOCUMENTS

WO    2012/124980 A2    9/2012
WO    2012/161510 A2   11/2012
(Continued)

OTHER PUBLICATIONS

International Search Report issued in corresponding application No. PCT/JP2014/074942 dated Dec. 9, 2014 (4 pages).
(Continued)

*Primary Examiner* — Phuc Tran
(74) *Attorney, Agent, or Firm* — Osha Liang LLP

(57) ABSTRACT

The present invention is designed so that uplink transmission is carried out adequately even when CA is executed by applying different duplex modes between multiple cells. A user terminal communicates with an FDD cell and a TDD cell by using carrier aggregation, and has a receiving section that receives DL signals transmitted from the cells, and a feedback control section that allocates and feeds back transmission acknowledgment signals in response to each DL signal in an uplink control channel of a predetermined cell, with reference to tables in which at least the states of transmission acknowledgment signals, PUCCH resources and QPSK symbol points are associated with each other, and, in this user terminal, the tables define different contents between the FDD cell and the TDD cell, and regardless of
(Continued)

TRANSMISSION OF FORMAT 1B HARQ-ACK
CHANNEL SELECTION FOR A=3 the cell where downlink control information is detected and the cell where downlink shared data is detected, the feedback control section uses the table that corresponds to the duplex mode of the predetermined cell where the transmission acknowledgment signals are transmitted.

8 Claims, 23 Drawing Sheets

(51) Int. Cl.
    *H04L 5/00*     (2006.01)
    *H04L 1/18*     (2006.01)
(52) U.S. Cl.
    CPC ......... *H04W 72/04* (2013.01); *H04W 72/042* (2013.01); *H04W 72/044* (2013.01); *H04W 72/0413* (2013.01)

(56) References Cited

FOREIGN PATENT DOCUMENTS

WO      2013/067665 A1      5/2013
WO      2014/098482 A1      6/2014

OTHER PUBLICATIONS

Written Opinion of the International Searching Authority issued in corresponding application No. PCT/JP2014/074942 dated Dec. 9, 2014 (4 pages).

3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

Extended European Search Report dated Mar. 2, 2017, in corresponding European Patent Application No. 14846860.6 (11 pages).

ETRI, 3GPP TSG RAN WG1 Meeting #74, "Discussion on FDD-TDD joint operation solutions," R1-133184, Barcelona, Spain, Aug. 19-23, 2013 (7 pages).

LG Electronics, 3GPP TSG RAN WG1 Meeting #74, "CA-based aspects for FDD-TDD joint operation," R1-133372, Barcelona, Spain, Aug. 19-23, 2013 (3 pages).

LG Electronics et al., 3GPP TSG RAN WG1 #74bis, "Way Forward on HARQ timing for TDD-FDD CA," R1-134859, Guanzhou, China, Aug. 7-11, 2013 (3 pages).

Decision to Grant a Patent dated Apr. 12, 2016, in corresponding Japanese Patent Application No. 2013-200353 (6 pages).

Office Action issued in the counterpart European Patent Application No. 14846860.6, dated Sep. 25, 2017 (6 pages).

Office Action issued in corresponding Egyptian Application No. 2016030511, dated Nov. 6, 2017 (8 pages).

Office Action issued in corresponding European Application No. 14846860.6, dated Mar. 14, 2018 (7 pages).

Sharp; "Deployment scenarios and requirements for TDD-FDD CA"; 3GPP TSG RAN WG1 Meeting #74, R1-133232; Barcelona, Spain; Aug. 19-23, 2013 (3 pages).

\* cited by examiner

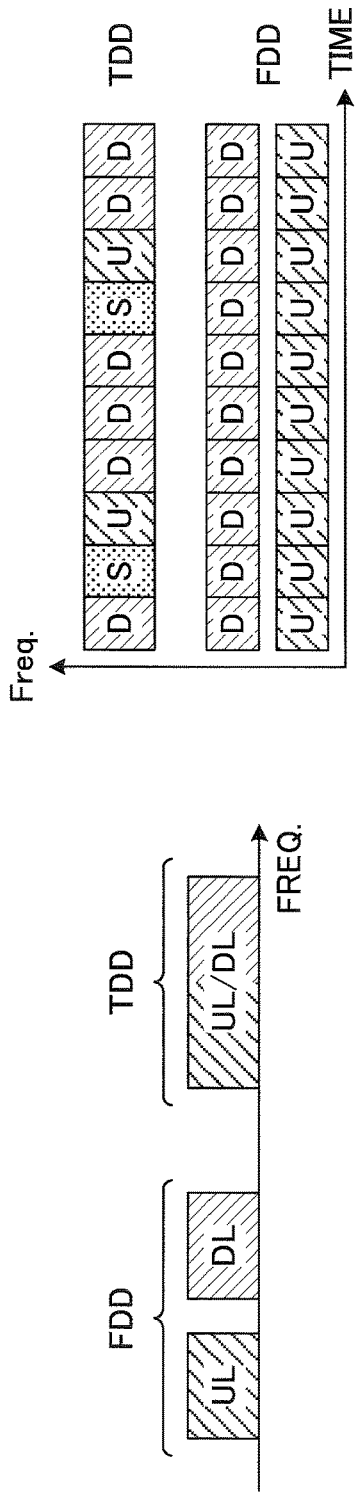
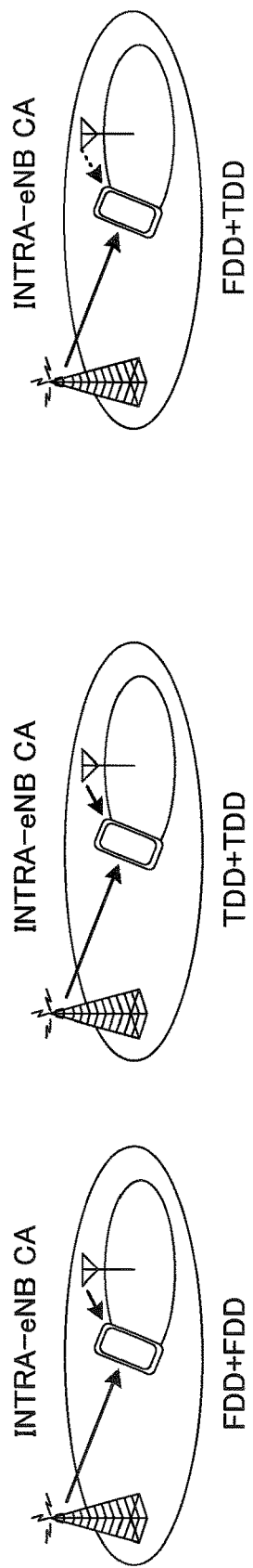
FIG.1A
FIG.1B
FIG.1C

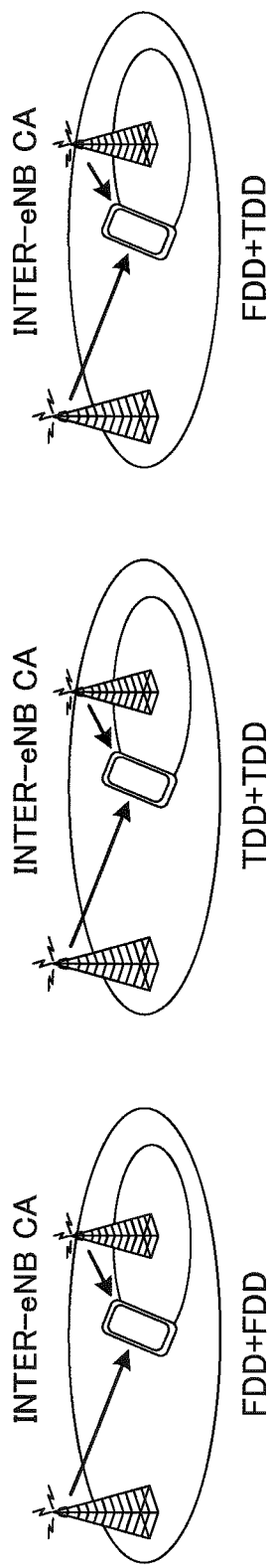

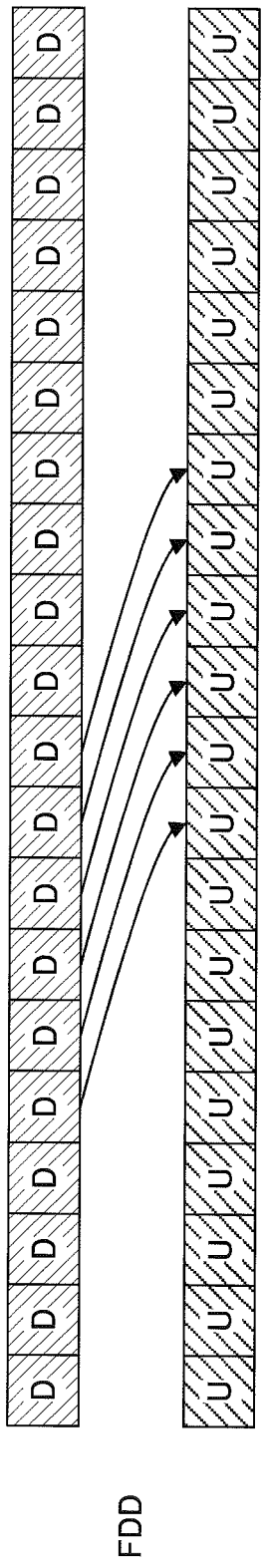
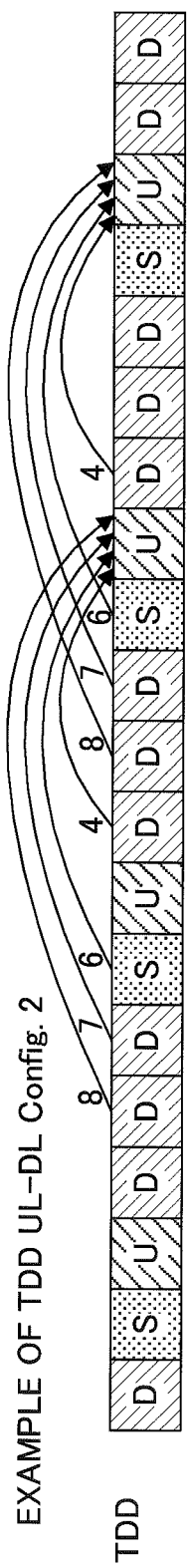
FIG.3A
FIG.3B

| VALUE OF 'TPC COMMAND FOR PUCCH' | $n^{(1)}_{PUCCH,j}$ or $(n^{(1)}_{PUCCH,j}, n^{(1)}_{PUCCH,j+1})$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

Note: $(n^{(1)}_{PUCCH,j}, n^{(1)}_{PUCCH,j+1})$ are determined from the first and second PUCCH resource lists configured by n1PUCCH-AN-CS-List-r10 in [11], respectively.

FIG.5B

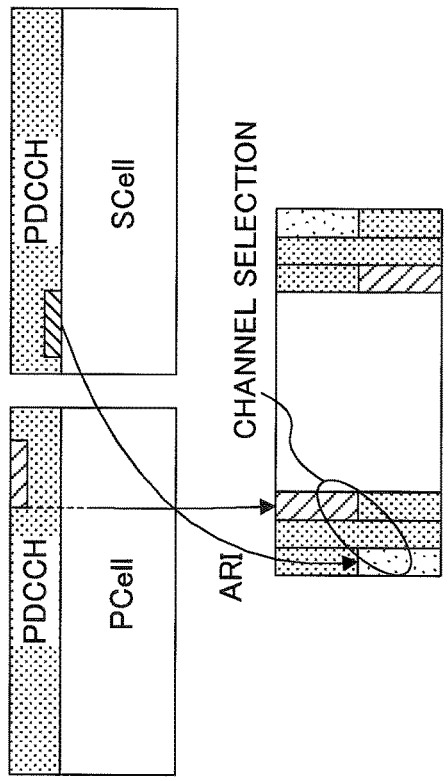

FIG.5A

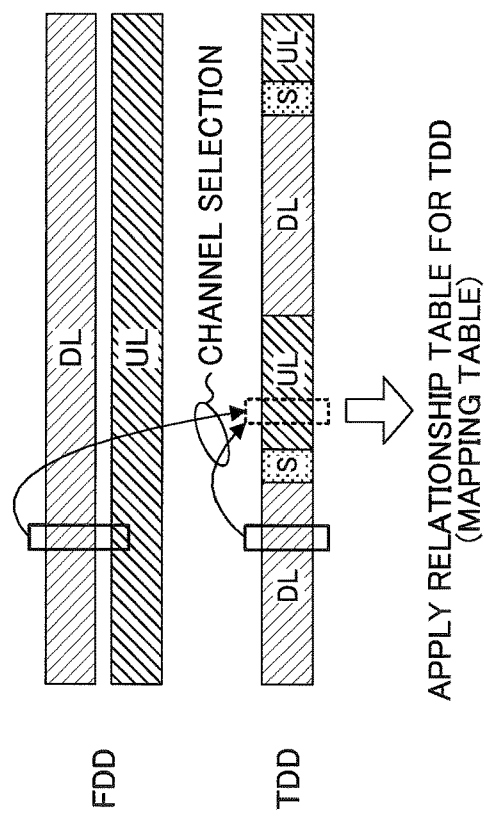

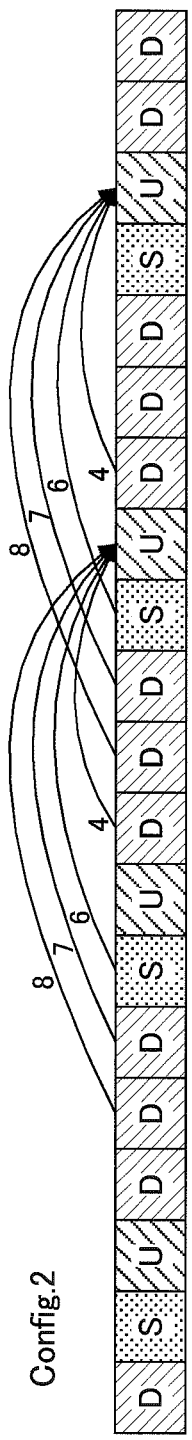
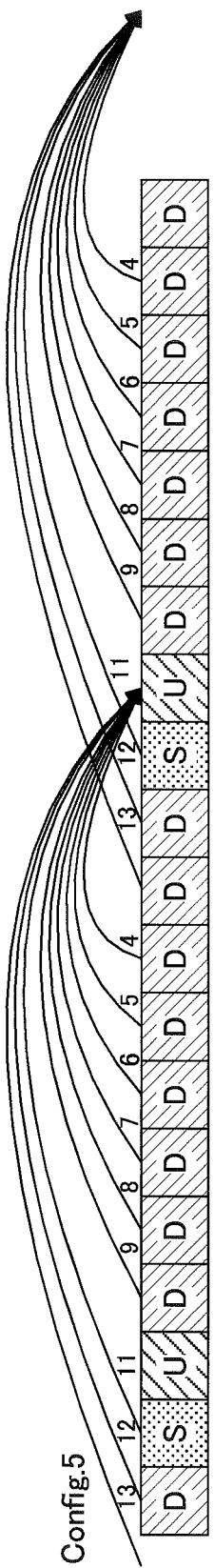
FIG.10A
FIG.10B

ALLOCATED BY NW → SF#0(DAI=1), SF#1(DAI=2), SF#2(DAI=3), SF#3(DAI=4)

DETECTED BY UE → SF#0(DAI=1), SF#1(DA̶I̶=̶2̶), SF#2(DAI=3), SF#3(DAI=4)

FIG.16A

ALLOCATED BY NW → SF#0(DAI=1), SF#1(DAI=2), SF#2(DAI=3)

DETECTED BY UE → S̶F̶#̶0̶(̶D̶A̶I̶=̶1̶)̶, SF#1(DAI=2), SF#2(DAI=3)

FIG.16B

USER TERMINAL, BASE STATION, AND RADIO COMMUNICATION METHOD

TECHNICAL FIELD

The present invention relates to a user terminal, a base station and a radio communication method that are applicable to a next-generation communication system.

BACKGROUND ART

In a UMTS (Universal Mobile Telecommunications System) network, the specifications of long term evolution (LTE) have been drafted for the purpose of further increasing high-speed data rates, providing lower delay and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) are under study for the purpose of achieving further broadbandization and increased speed beyond LTE, and the specifications thereof have been drafted (Rel. 10/11).

As duplex modes in LTE and LTE-A systems, there are frequency division duplex (FDD) to divide between the uplink (UL) and the downlink (DL) based on frequency, and time division duplex (TDD) to divide between the uplink and the downlink based on time (see FIG. 1A). In TDD, the same frequency region is applied to uplink and downlink communication, and signals are transmitted and received to and from one transmitting/receiving point by dividing the uplink and the downlink based on time.

Also, the system band of the LTE-A system (Rel. 10/11) includes at least one component carrier (CC), where the system band of the LTE system constitutes one unit. Gathering a plurality of components carriers (cells) to achieve a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

In carrier aggregation (CA), which was introduced in Rel. 10/11, the duplex mode to employ between a plurality of CCs (also referred to as "cells," "transmitting/receiving points," etc.) is limited to the same duplex mode (see FIG. 1B). On the other hand, future radio communication systems (for example, Rel. 12 and later versions) may anticipate CA to employ different duplex modes (TDD+FDD) between multiple CCs (see FIG. 1C).

Also, Rel. 10/11 anticipates intra-base station CA (intra-eNB CA), which controls CA by using one scheduler between multiple CCs. In this case, the PUCCH signals (transmission acknowledgment signals (ACKs/NACKs), etc.) in response to DL data signals (PDSCH signals) transmitted in each CC are multiplexed to be aggregated in a specific CC (primary cell (PCell)) and transmitted.

When conventional feedback mechanism is used in CA in which different duplex modes (TDD+FDD) are employed between multiple CCs, there is a risk that transmission acknowledgment signals and so on cannot be transmitted adequately on the uplink.

The present invention has been made in view of the above, and it is therefore an object of the present invention to provide a user terminal, a base station and a radio communication method, whereby uplink transmission can be carried out adequately even when CA is executed by applying different duplex modes between multiple cells.

Solution to Problem

The user terminal according to the present invention provides a user terminal that communicates with an FDD cell and a TDD cell by using carrier aggregation, and that has a receiving section that receives DL signals transmitted from the cells, and a feedback control section that allocates and feeds back transmission acknowledgment signals in response to the DL signals in an uplink control channel of a predetermined cell, with reference to a table in which at least the states of transmission acknowledgment signals, PUCCH resources and QPSK symbol points are associated with each other, and, in this user terminal, the table is defined differently between the FDD cell and the TDD cell, and regardless of a cell where downlink control information is detected and a cell where downlink shared data is detected, the feedback control section uses a table that corresponds to the duplex mode of the predetermined cell where the transmission acknowledgment signals are transmitted.

Advantageous Effects of Invention

According to the present invention, it is possible to carry out uplink transmission adequately even when CA is executed by applying different duplex modes between multiple cells.

BRIEF DESCRIPTION OF DRAWINGS

FIG. 1 provides diagrams to explain an overview of duplex modes in LTE and LTE-A, and intra-base station CA (intra-eNB CA);

FIG. 2 provides diagrams to explain intra-base station CA (intra-eNB CA) and inter-base station CA (inter-eNB CA);

FIG. 3 provides diagrams to explain the DL HARQ timings (uplink A/N feedback timings) in FDD and TDD;

FIG. 5 provides diagrams to explain PUCCH format 1b with channel selection;

FIG. 6 provides diagrams to explain an example of channel selection in TDD-FDD CA;

FIG. 10 provides diagrams to explain A/N feedback in a TDD cell;

FIG. 16 provides diagrams to explain another example of a PUCCH resource determining method;

DESCRIPTION OF EMBODIMENTS

Figure 4:
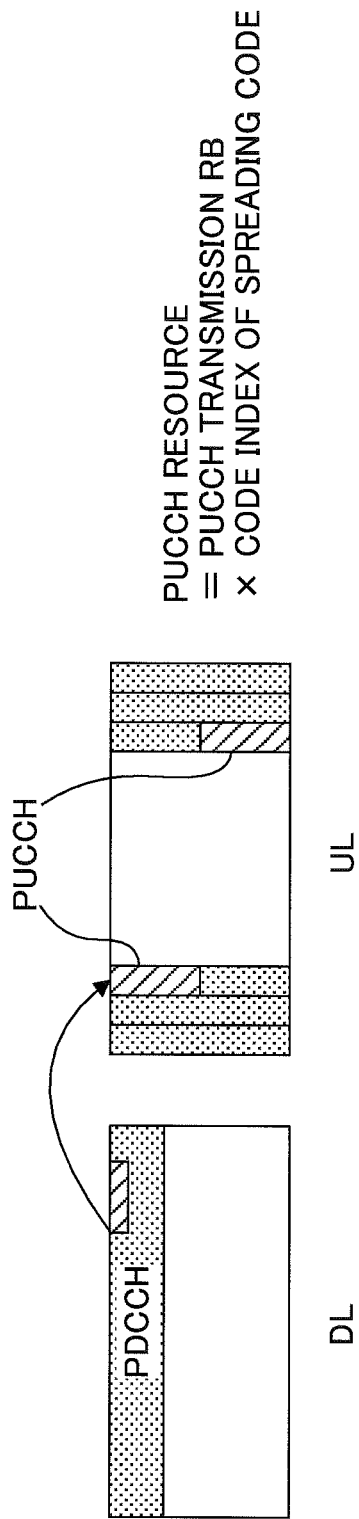
FIG. 4 is a diagram to explain PUCCH format 1b.

As noted earlier, in LTE and LTE-A systems, two duplex modes—namely, FDD and TDD—have been provided (see above FIG. 1A). Also, from Rel. 10 onward, support for intra-base station CA (intra-eNB CA) has been provided. However, CA in Rel. 10/11 is limited to the same duplex mode (FDD+FDD intra-eNB CA or TDD+TDD intra-eNB CA) (see above FIG. 1B).

Meanwhile, the systems of Rel. 12 and later versions presume intra-base station CA (intra-eNB CA), which employs different duplex modes (TDD+FDD) between multiple CCs (see above FIG. 1C). Furthermore, the systems of Rel. 12 and later versions also presume employing inter-base station CA (inter-eNB CA) (see FIG. 2A). Note that inter-base station CA is supported regardless of the duplex mode, and it may be possible to introduce inter-base station CA, which accommodates different duplex modes (TDD+FDD).

In intra-base station CA (intra-eNB CA), scheduling is controlled using one scheduler between multiple cells (see FIG. 2B). That is, a user terminal has only to feed back uplink control signals (UCI) such as a transmission acknowledgment signal (ACK/NACK (hereinafter also referred to as "A/N")) and/or the like to a specific cell (PCell) alone.

Meanwhile, in inter-base station CA (inter-eNB CA), schedulers are provided separately for each of multiple cells, and scheduling is controlled on a per cell basis. Also, inter-eNB CA presumes that each base station is connected in such a manner that the delay is not negligible (non-ideal backhaul connection). Consequently, the user terminal has to feed back uplink control signals (UCI) to each cell (see FIG. 2C).

When CA is executed by applying different duplex modes between multiple CCs (cells) (TDD-FDD CA), the problem is how user terminals should send A/N feedback. For example, it may be possible that each cell employs conventional feedback mechanism on an as-is basis in TDD-FDD CA.

FIG. 3A shows a case where, in a cell employing FDD (hereinafter also referred to as an "FDD cell"), a user terminal feeds back A/N's in response to PDSCH signals with conventional timing. In this case, the user terminal feeds back the A/N's in UL subframes that come a predetermined number of subframes after (for example, 4 ms after) the DL subframes in which the PDSCH signals are allocated.

FIG. 3B shows a case where, in a cell employing TDD (hereinafter also referred to as a "TDD cell"), a user terminal feeds back A/N's in response to PDSCH signals with conventional timing. In this case, the user terminal feeds back the A/N's in UL subframes that are assigned in advance to the DL subframes in which the PDSCH signals are allocated.

In TDD up to the Rel. 10 system, the configuration ratio of UL and DL has had a plurality of patterns (DL/UL configurations 0 to 6), and, in each DL/UL configuration, the DL subframes to be allocated to UL subframes are determined. For example, FIG. 3B shows the case of DL/UL configuration 2 (DL/UL Config. 2), in which each DL subframe is allocated to (associated with) a predetermined UL subframe. In FIG. 3B, the number that is assigned to each DL subframe (including special subframes) shows the number of subframes from the corresponding UL subframe.

In conventional systems, the timing to feed back A/N's (DL HARQ timing) stays the same even when CA is employed. However, even when CA is applied to UL, A/N transmission using the PUCCH is determined to be carried out only in a specific cell (PCell).

Also, in conventional systems, a plurality of formats (PUCCH formats) are defined for the PUCCH transmission of uplink control signals such as transmission acknowledgment signals (A/N signals) and channel quality information (CQI). Now, PUCCH format 1b defined for A/N feedback will be described below.

When CA is not employed in an FDD cell (non-CA), the A/N's that are fed back from each user terminal in one subframe are one or two bits. In this case, the user terminals apply PUCCH format 1a/1b and feed back one or two A/N bits by using BPSK or QPSK (BPSK or QPSK modulation). In PUCCH format 1a/1b, the PUCCH resource to allocate an A/N is determined based on the place where downlink control information (DL DCI) is scheduled (PDCCH/EPDCCH resource index (CCE/ECCE index)) and a parameter that is reported through RRC signaling (RRC parameter) (see FIG. 4). In this case, it is possible to encode and multiplex maximum thirty six A/N's per RB.

When CA (two CCs) is employed in an FDD cell, the A/N's that are fed back from each user terminal in one subframe require maximum four bits. In this case, the user terminals apply PUCCH format 1b with channel selection and transmit maximum four A/N bits. In PUCCH format 1b with channel selection (hereinafter also referred to simply as "channel selection"), a PUCCH resource candidate is determined from the place where DL DCI for the PCell is scheduled (CCE/ECCE index), and an RRC parameter. Also, another PUCCH resource candidate is determined from a TPC command (ARI) that is included in DL DCI for an SCell, and an RRC parameter (see FIG. 5A).

The ARI is an ACK/NACK resource indicator (A/N resource indicator) that was introduced in Rel. 10, and is used to specify the PCell's PUCCH resource that is used to send A/N feedback for the PDSCH transmitted from the SCell when CA is employed. To be more specific, a plurality of PUCCH resource candidates are reported in advance to a user terminal through higher layers such as RRC, and one among these is specified by the ARI.

In channel selection, maximum four A/N bits are represented by using a plurality of PUCCH resource candidates and QPSK symbols. The user terminals select and feed back predetermined PUCCH resources/QPSK symbol points depending on each cell's A/N contents.

For example, assume a case here where, in PUCCH format 1b with channel selection, four PUCCH resource candidates are configured. In this case, the PUCCH resource for when channel selection is not executed (PUCCH format 1b) and the PUCCH resource following that PUCCH resource will be referred to as PUCCH resource candidates 1 and 2, respectively. The PUCCH resource candidate 2 can be calculated by adding +1 to the CCE/ECCE that is used to calculate the PUCCH resource candidate 1. Also, from a set of four resource candidates that are configured in advance by RRC signaling, PUCCH resources that are specified dynamically by TPC commands (ARIs) contained in the SCell's DCI are PUCCH resource candidates 3 and 4 (see FIG. 5B).

In PUCCH format 1b with channel selection, a user terminal targets different PUCCH resources and/or different QPSK symbol points for mapping, depending on the A/N/DTX state (hereinafter also referred to as the "A/N state"). To be more specific, the user terminal controls A/N feedback based on a relationship table (mapping table), which defines the associations/relationships between A/N states, PUCCH resources and QPSK symbol points.

On the other hand, since A/N's for a plurality of DLs are allocated to one UL in a TDD cell, even when CA is not employed (non-CA), A/N feedback of more than two bits is required. Consequently, in TDD, it is possible to execute A/N bundling, which bundles and processes A/N's for a plurality of DL subframes as one A/N. In this case, feedback can be sent by using PUCCH format 1a/1b. Meanwhile, in TDD, even when CA is not employed, it is possible to configure the above-noted PUCCH format 1b with channel selection and PUCCH format 3. When CA is employed, the above PUCCH format 1b with channel selection and PUCCH format 3 are employed. In PUCCH format 3, a PUCCH resource candidate is determined from a TPC command (ARI) that is included in DL DCI for an SCell, and an RRC parameter.

In this way, existing systems provide different PUCCH mechanisms between FDD and TDD, and do not assume PUCCH transmission for when CA is carried out by applying different duplex modes between multiple cells (multiple CCs) (TDD-FDD CA). For example, in TDD-FDD CA, when ACKs/NACKs for multiple CCs (for example, two CCs) are gathered in one cell (CC) and transmitted, how a user should apply the PUCCH format and carry out A/N transmission is the problem.

In particular, in existing system, each A/N bit is defined to correspond to PUCCH resources/QPSK symbol points differently between FDD and TDD. Consequently, when existing feedback mechanism is used in TDD-FDD CA, there is a threat that troubles might occur.

So, the present inventors have come with the idea of, when channel selection is carried out in TDD-FDD CA by using tables which each define different contents between the FDD cell and the TDD cell, selecting between the tables based on the duplex mode of the cell where PUCCH transmission is carried out. Also, the present inventors have come up with idea of carrying out channel selection by using the TDD table, regardless of the cell where PUCCH transmission is carried out. Furthermore, the present inventors have come up with the idea of employing A/N bundling in the FDD cell and/or in the TDD cell in TDD-FDD CA channel selection.

Now, the present embodiment will be described below in detail with reference to the accompanying drawings.

First Aspect

With the First aspect, when PUCCH format 1b with channel selection is employed in TDD-FDD CA, a predetermined relationship table is selected for use, based on the duplex mode of the cell (CC) to carry out PUCCH transmission. That is, regardless of which cell's downlink control information (DL DCI) is detected or which cell's PDSCH is received, a user terminal executes channel selection by using the mapping table that corresponds to the duplex mode of the cell (CC) to carry out PUCCH transmission.

FIG. 6A shows a case where an A/N in response to the DL signal from the TDD cell and an A/N in response to the DL signal from the FDD cell are transmitted by using a PUCCH resource of the TDD cell, by employing channel selection. That is, based on the state of the A/N for the TDD cell and the state of the A/N for the FDD cell, the user terminal selects a predetermined PUCCH resource and a QPSK symbol point from the mapping table and carries out PUCCH transmission from the TDD cell.

In this case, the user terminal selects the channel selection relationship table for the TDD cell to carry out PUCCH transmission. Note that, for the channel selection relationship table for the TDD cell, the TDD cell mapping table that is defined in Rel. 11 (see FIG. 6B) can be used. Note that mapping table to be associated with the TDD cell is not limited to that illustrated in FIG. 6B.

Figures 7A, 7B:
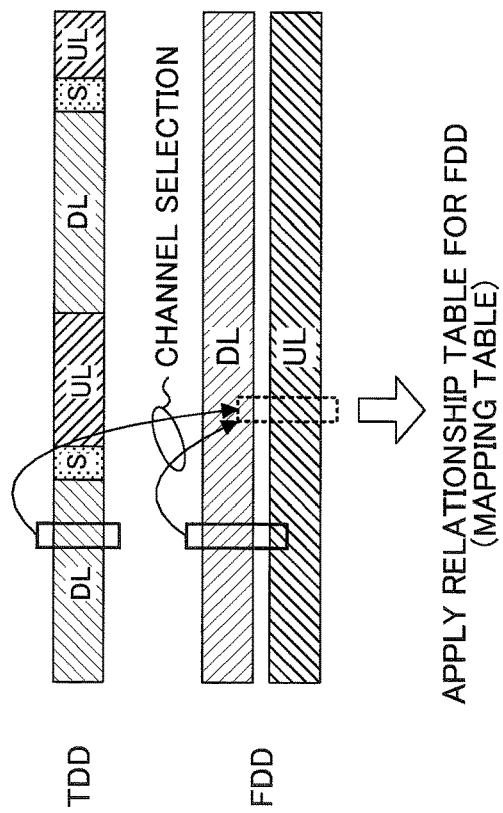
FIG. 7 provides diagram to explain another example of channel selection in TDD-FDD CA.

FIG. 7A shows a case where an A/N in response to the DL signal from the TDD cell and an A/N in response to the DL signal from the FDD cell are transmitted by using a PUCCH resource of the FDD cell by employing channel selection. That is, based on the state of the A/N for the TDD cell and the state of the A/N for the FDD cell, the user terminal selects a predetermined PUCCH resource and a QPSK symbol point from the mapping table and carries out PUCCH transmission from the FDD cell.

In this case, the user terminal selects the channel selection relationship table for the FDD cell to carry out PUCCH transmission. Note that, for the channel selection relationship table for the FDD cell, the TDD cell mapping table defined in Rel. 11 (see FIG. 7B) can be used. Note that the mapping table to be associated with the FDD cell is not limited to that of FIG. 7B.

In this way, with the first aspect, the user terminal performs channel selection by using a relationship table that corresponds to the duplex mode of the cell where PUCCH transmission is carried out. By this means, when the user terminal fails to receive DL DCI in the CC where the PUCCH is not transmitted (detection failure), it is still possible to apply the feedback mechanism which does not employ CA (non-CA) on an as-is basis (fallback).

Figure 8A:
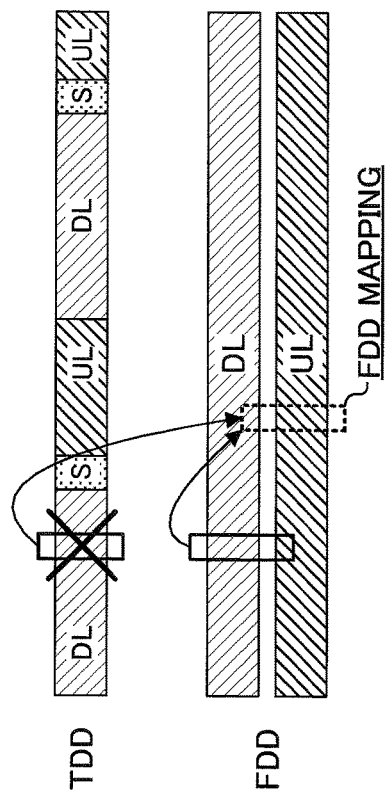
FIG. 8 provides diagrams to explain another example of channel selection in TDD-FDD CA.
Figure 8B:
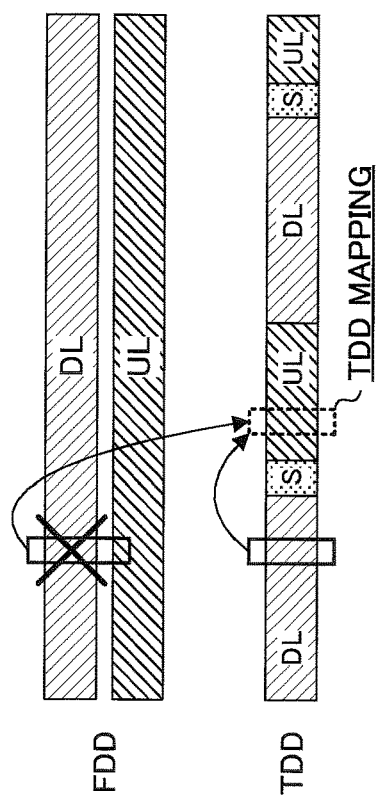

For example, when the user terminal detects only a DL DCI assignment in the TDD cell (fails to detect the FDD cell's DCI), the user terminal allocates an A/N in response to this TDD cell's DL DCI, to a PUCCH resource of the TDD cell (see FIG. 8A). On the other hand, when the user terminal detects only a DL DCI assignment in the FDD cell (fails to detect the TDD cell's DCI), the user terminal allocates an A/N in response to this FDD cell's DL DCI, to a PUCCH resource of the FDD cell (see FIG. 8B).

In this case, seen from the NW (for example, base stations), it is possible to judge that all the user terminals that carry out PUCCH transmission in the same CC are transmitting A/N's in accordance with the same mapping table. Consequently, as long as mapping decoding algorithms are implemented on a per CC basis, it is possible to simplify the circuit structure in the base stations.

Also, by employing the first aspect, it is possible to support enhancement to inter-base station CA (inter-eNB CA). As described above, when non-ideal backhaul connection is used in inter-eNB CA, the user terminal may carry out PUCCH transmission to each base station. In inter-eNB CA, the first aspect can be applied on an as-is basis, when channel selection is carried out in one or in each base station.

FIG. 9 shows a case where, in TDD-FDD CA (inter-eNB CA), A/N's in response to the DL signal (PDSCH signal) of each cell are allocated to a PUCCH resource of each cell.

Figure 9B:
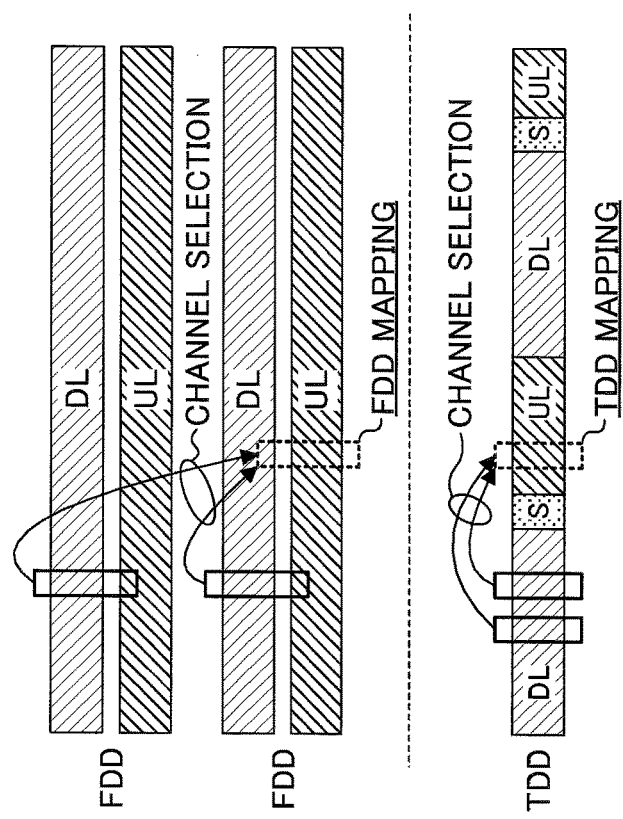
FIG. 9 provides diagrams to explain an example of channel selection in TDD-FDD inter-eNB CA.
Figure 9A:
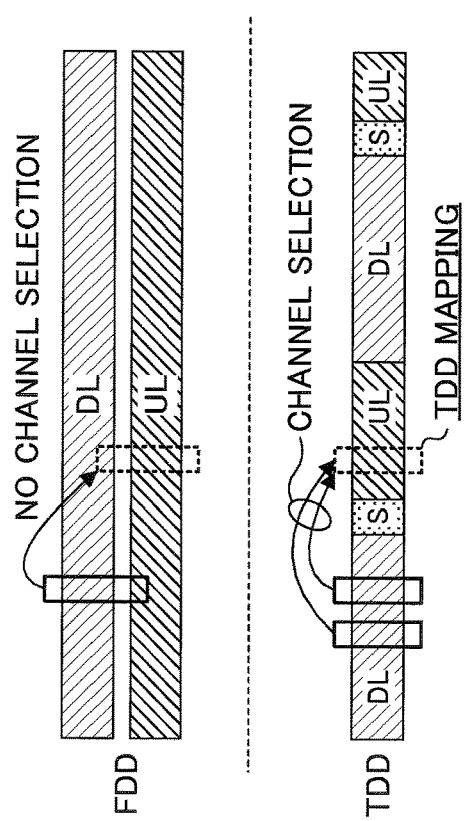

FIG. 9A shows a case where, in the TDD cell, A/N's in response to a plurality of DL subframes are allocated to a PUCCH resource of the TDD cell by using channel selection. With the first aspect, the user terminal selects the channel selection relationship table for the TDD cell for PUCCH transmission in the TDD cell. Consequently, even in the channel selection in inter-eNB CA shown in FIG. 9A, the user terminal selects the relationship table for the TDD cell for PUCCH transmission in the TDD cell, and therefore A/N feedback can be executed adequately.

FIG. 9B shows a case where a plurality of FDD cells are engaged in intra-eNB CA, and where these multiple FDD cells and TDD cells are engaged in inter-eNB CA. In this case, the user terminal gathers the A/N's of the individual FDD cells in one FDD cell (for example, the PCell), and carries out A/N transmission. That is, the user terminal employs channel selection and carries out PUCCH transmission from one FDD cell. With the first aspect, the user terminal selects the channel selection relationship table for the FDD cell for PUCCH transmission in the FDD cell. Consequently, even in FIG. 9B, the user terminal selects the relationship table for the FDD cell for PUCCH transmission in the FDD cell, and therefore can execute A/N feedback adequately. Note that the TDD cell is the same as in above FIG. 9A.

Second Aspect

As described above, PUCCH format 1b with channel selection supports up to 2-CC CA. In the FDD cell, A/N transmission in response to a DL signal is fed back in a UL subframe that comes a predetermined period (4 ms) after the DL subframe in which that DL signal is transmitted. Consequently, in FDD, A/N's never exceed maximum four bits in the event of two CCs.

On the other hand, in TDD, A/N's for a plurality of DL subframes are transmitted in one UL in each CC, so that cases might occur where more than four bits are involved in the event of two CCs. For example, in TDD, if CA is executed in UL/DL configuration 2, the A/N's to feed back in one UL become sixteen bits (four subframes×two CWs× two CCs) (see FIG. 10A). TDD in existing systems provides for, when more than four bits are involved, employing A/N spatial bundling and making A/N's for two CWs a one-bit A/N.

By employing spatial bundling of A/N's, the A/N's to feed back in one UL subframe in FIG. 10A become maximum eight bits (=16/2). PUCCH format 1b with channel selection in TDD provides for A/N feedback of up to eight bits (four bits in FDD).

As noted earlier, although a plurality of DL/UL configurations are defined in TDD (DL/UL configurations 0 to 6), DL/UL configuration 5 alone is designed so that A/N's in response to DL subframes of over four subframes are concentrated as one (see FIG. 10B). Consequently, in existing systems, TDD DL/UL configuration 5 does not support channel selection.

Figure 11:
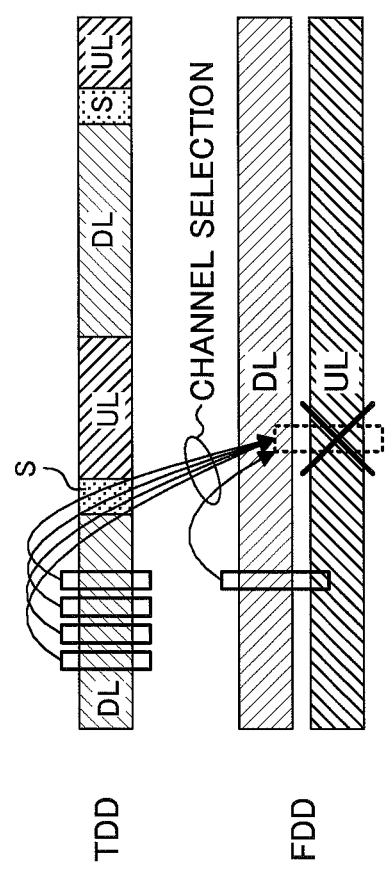
FIG. 11 is a diagram to explain another example of channel selection in TDD-FDD CA.

Now, in TDD-FDD CA, if channel selection for the FDD cell is employed as shown in FIG. 11, in the TDD cell, it is not possible to provide DL assignments for multiple subframes (A/N transmission in response to multiple DL subframes). This is because existing systems provide for channel selection for FDD-FDD CA (two CCs), and provide support for only maximum four bits.

Figure 12:
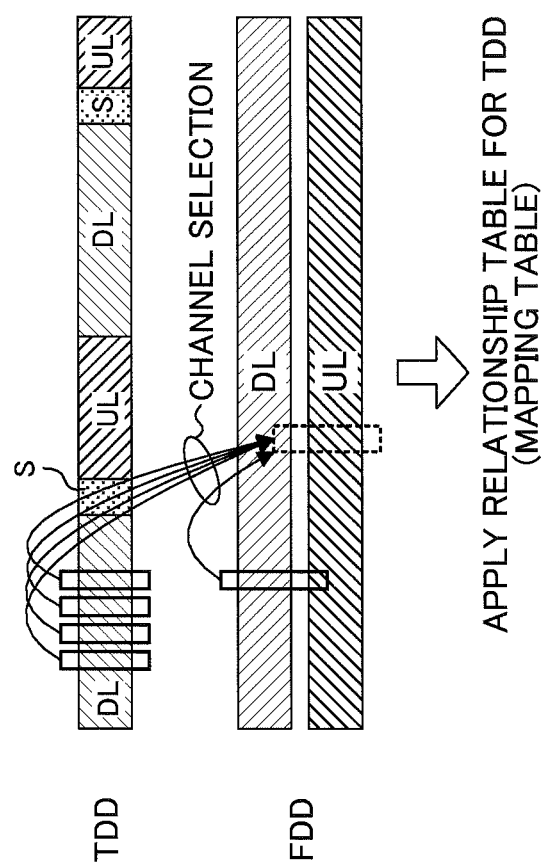
FIG. 12 is a diagram to explain another example of channel selection in TDD-FDD CA.

Consequently, with the second aspect, the relationship table for TDD is used when channel selection is employed in TDD-FDD CA. That is, in TDD-FDD CA, regardless of which cell's downlink control information (DL DCI) is detected, which cell's PDSCH is received, or which cell's PUCCH is transmitted, the user terminal uses the mechanism of PUCCH format 1b with channel selection for TDD. FIG. 12 shows a case where the channel selection relationship table for TDD is used for PUCCH transmission from the FDD cell.

Given that TDD-FDD CA is based on the premise that at least one TDD cell is engaged in CA, although there is a high possibility that more than four bits of A/N's are produced, it is still possible to use channel selection adequately in TDD-FDD CA, by applying the second aspect.

Note that, with the second aspect, when there are more than four bits of A/N's, bundling may be executed in the spatial direction (spatial bundling) in the FDD cell and/or in the TDD cell, as in TDD CA. By this means, even when employing spatial multiplexing (or MIMO) results in an increased number of A/N bits, adequate feedback is still possible. Also, in TDD, when a large number of DL subframes correspond to A/N's, it is possible to execute channel selection by using a mapping table which defines the relationships between A/N states and PUCCH resources/QPSK symbol points (constellation)/code sequences (RM code input bits).

Third Example

Figure 13:
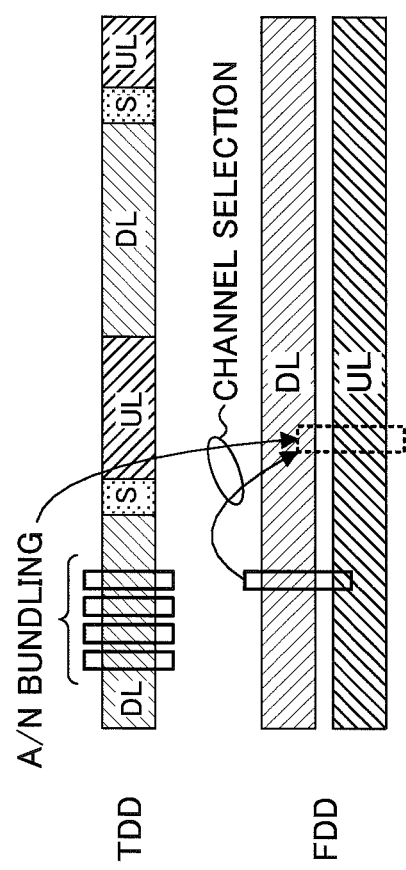
FIG. 13 is a diagram to explain another example of channel selection in TDD-FDD CA.

When TDD-FDD CA is employed, a user terminal can use A/N bundling in the subframe direction in the TDD cell. For example, the user terminal employs PUCCH format 1b with channel selection by using the TDD cell's A/N's, which are bundled in one bit (or two bits) by A/N bundling, and the FDD cell's A/N's (one bit or two bits). FIG. 13 shows a case where A/N's (one bit or two bits) to correspond to the TDD cell, bundled by A/N bundling in the subframe direction, and A/N's (one bit or two bits) to correspond to the FDD cell are transmitted in PUCCH transmission from the FDD cell, by using channel selection.

In this way, by making A/N's maximum four bits by employing A/N bundling, regardless of whether the PUCCH-transmitting cell is in FDD or in TDD, the user terminal can execute channel selection by using the mapping table for either the TDD cell or the FDD cell.

Figure 14:
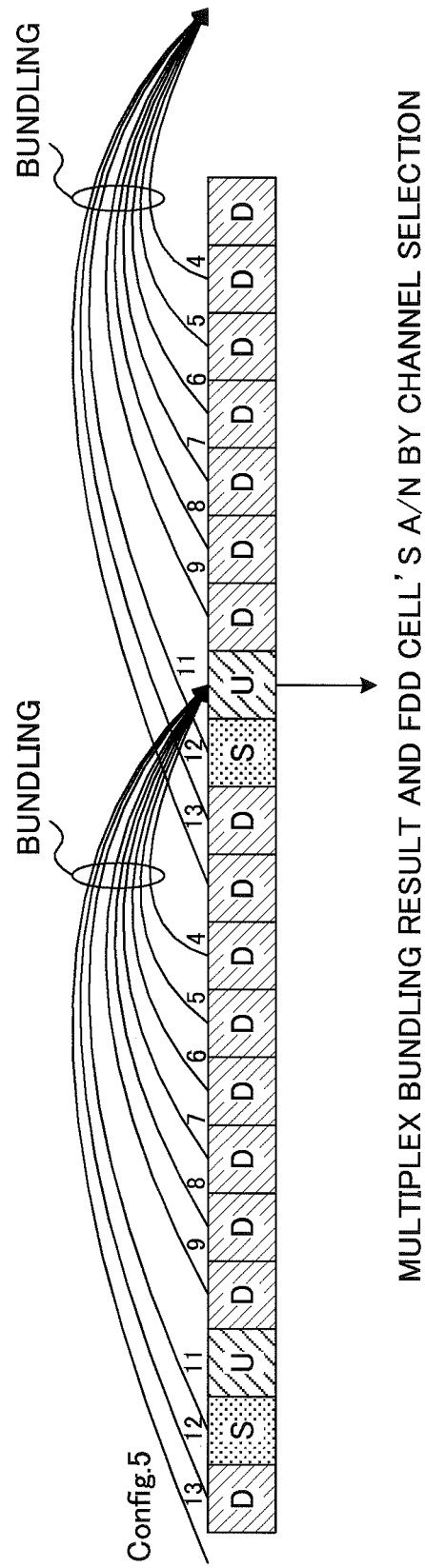
FIG. 14 is a diagram to explain A/N feedback in a TDD cell (DL/UL configuration 5)

Also, since channel selection is executed after A/N bundling applied in the subframe direction, with the third example, channel selection can be applied even to TDD DL/UL configuration 5, which is not supported in existing systems. To be more specific, the user terminal can bundle A/N's for maximum nine DL subframes, and multiplex and transmit the bundling result with the FDD cell's A/N's by way of channel selection (see FIG. 14).

Furthermore, with the third example, A/N bundling is executed in the subframe direction so as to provide one bit, bundling in the spatial direction is not necessary. In other words, when A/N bundling is employed in the subframe direction and yet bundling is not executed in the spatial direction, the maximum number of A/N bits can be made four bits. In this way, by not executing bundling in the spatial direction, HARQ for when spatial multiplexing (or MIMO) is employed can be executed per spatial multiplexing (or MIMO) stream, so that, by executing adaptive HARQ in a minute manner, it is possible to heighten the effect of improving throughput.

Figure 15:
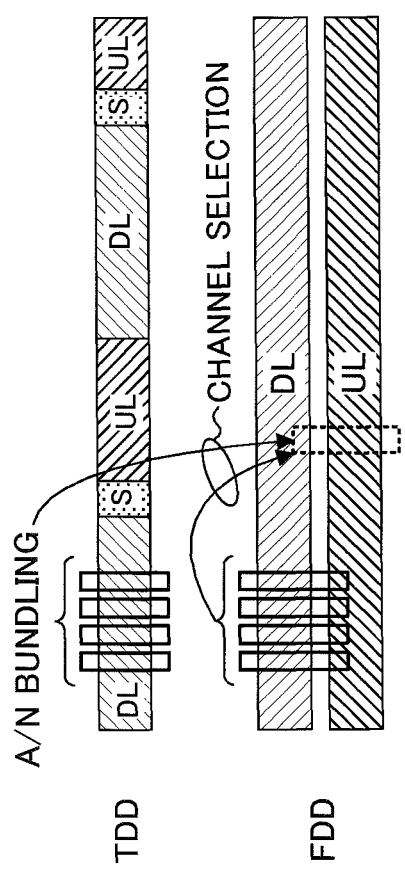
FIG. 15 is a diagram to explain another example of channel selection in TDD-FDD CA.

Note that, although a case has been shown with reference to FIG. 13 where A/N bundling is applied to the TDD cell, this is by no means limiting, and it is equally possible to apply bundling to the FDD cell as well. For example, as shown in FIG. 15, it is possible to bundle A/N's for a plurality of DL subframes in the FDD cell, and multiplex and transmit these bundled A/N's with A/N's that are bundled in the TDD cell, by way of channel selection. Note that, although FIG. 15 shows a case where A/N's for the same number of DL subframes (for example, four subframes) are bundled in the FDD cell and in the TDD cell, the number of A/N's to bundle may vary in each cell.

In this way, by applying A/N bundling to the FDD cell, it is possible to allocate A/N's for more DL subframes to one UL subframe and feed them back in one PDCCH. AS a result, it is possible to improve the spectral efficiency of UL resources.

Fourth Example

As described above, in the TDD cell, DL subframes are allocated over multiple subframes, and A/N's for a plurality of DL subframes are fed back in one UL subframe. At this time, if the user terminal fails to detect a DL assignment (PDCCH signal) in a DL subframe in the middle amongst these multiple DL subframes, the user terminal cannot send adequate A/N feedback.

For example, assume a case where DL signals are transmitted to the user terminal in four consecutive subframes (SFs #0 to #3). In this case, if the user terminal fails to detect the DL assignment (PDCCH signal) of SF #1, the user terminal judges that DL signals are transmitted in three subframes SFs #0, #2 and #3. Consequently, if the user terminal executes A/N bundling in the subframe direction, the user terminal feeds back an ACK if these three subframes (SFs #0, #2 and #3) are OK (ACK). In this way, if a detection failure occurs on the user terminal side, DL HARQ cannot be executed properly.

In order to solve this problem, TDD has heretofore provided support for the two-bit DAI in downlink control information (DCI). The DAI functions as a counter, and its value increases by one per DL assignment. That is, when the user terminal fails to detect a DL assignment in the middle, the DAI count value skips one count, so that the failed detection is brought to attention.

For example, when DL signals are transmitted to the user terminal in four consecutive subframe (SFs #0 to #3), the DCIs of SFs #0 to #3 include DAI=1 to 4, respectively. When the user terminal fails to detect the DL assignment (PDCCH signal) in SF #1, this results in the state in which DAI=2 cannot be acquired and is missing in the user terminal, so that the user terminal can judge that a detection failure has occurred with the DL assignment of SF #1 (see FIG. 16A). As a result of this, the user terminal can recognize that the A/N for SF #1 which comes in second is wrong.

Also, when DL signals are transmitted to the user terminal in three subframes (SFs #0, #2 and #3), the DCIs of SFs #0, #2 and #3 include DAI=1 to 3, respectively. If the user terminal fails to detect the DL assignment (PDCCH signal) in SF #0, this results in the state in which DAI=1 cannot be acquired and is missing in the user terminal, so that the user terminal can judge that a detection failure has occurred with the DL assignment of SF #0 or #1 (see FIG. 16B). As a result of this, the user terminal can recognize that the first A/N (for SF #0 or #1) is wrong.

In this way, in TDD where A/N bundling in the subframe direction may be employed, DAI is supported. That is, conventionally, support for the DAI has been provided in TDD, and in TDD DL/UL configurations 1 to 6, which feed back A/N's in response to multiple DLs in one UL.

Note that, among the TDD DL/UL configurations, in DL/UL configuration 0, which has a low DL subframe ratio (a high UL subframe ratio), the DAI is not supported because A/N's for multiple DLs are not fed back in one UL subframe. Also, FDD has no motive to provide support for the DAI, and so the DAI is not supported in FDD either.

Consequently, the present inventors have found out that, when, in TDD-FDD CA, A/N bundling and so on are applied to A/N's for a plurality of consecutive DL subframes in FDD, it is not possible to utilize the DAI, and therefore there is threat that the performance of DL HARQ might deteriorate.

So, the present inventors have found out supporting the DAI in FDD. For example, when A/N bundling is applied to the FDD cell in TDD-FDD CA, a DAI of predetermined bits (for example, two bits) is configured in the FDD cell's DL DCI. By this means, even in the FDD cell, it is possible to maintain the DL HARQ performance for when A/N bundling is employed, as in TDD.

Figure 17:
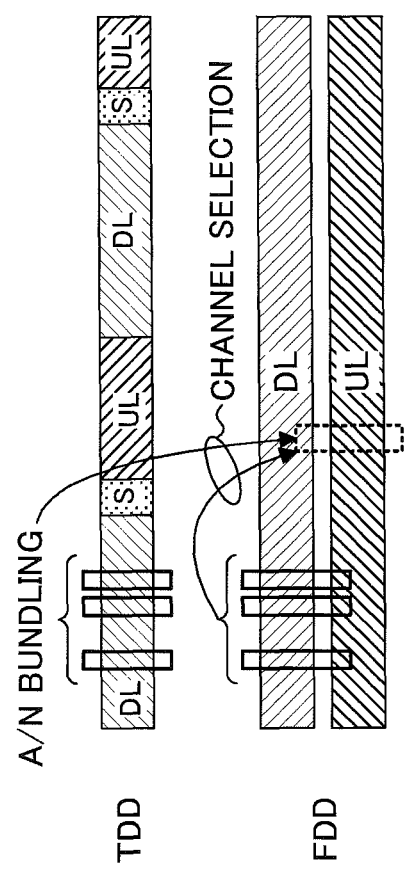
FIG. 17 is a diagram to explain another example of channel selection in TDD-FDD CA.

Also, according to the fourth example, instead of configuring a DAI of predetermined bits (for example, two bits) in the FDD cell's DL DCI, it is possible to realize a predetermined function by limiting the DL assignments of the FDD cell to the same subframes as those of the TDD cell's DL assignments. That is, the DAI that is contained in the TDD cell's DL DCI is used as a DAI for both the FDD cell and the TDD cell. For example, assume a case here where a user terminal sends A/N's for the TDD cell that are bundled in A/N bundling and A/N's for the FDD cell that are bundled in A/N bundling in PUCCH transmission from one cell, by using channel selection (see FIG. 17).

For example, when DL assignments are provided in predetermined DL subframes (SFs #0, #2 and #3) in the TDD cell, DL assignments are provided in SFs #0, #2 and #3 in the FDD cell as well, as in the TDD cell. Consequently, the DAI of the TDD cell functions as a counter for both the TDD cell and the FDD cell. That is, the DAI included in the DCI in each DL subframe of the TDD cell is used for the FDD cell as well.

By this means, it is possible to adequately execute A/N bundling in the FDD cell, as in the TDD cell, and, given that it is not necessary to add a two-bit DAI to the DL DCI of the FDD cell, it is possible to reduce the increase of DCI overhead.

(Variation)

Note that, although cases have been described with the above embodiment where the feedback timing for when CA is not employed is used as the HARQ timing in response to the allocation of DL signals (PDSCH signals) of both the FDD cell and the TDD cell, the present embodiment is by no means limited to this. For example, it is possible to make the DL HARQ timing in the TDD cell the same as the DL HARQ timing in FDD, in intra-eNB CA (see FIG. 23). In this case, the A/N in response to the PDSCH signal that is transmitted in a DL subframe of the TDD cell can be fed back in a UL subframe of the FDD cell that comes a predetermined period (for example, 4 ms) after the subframe in which the PDSCH signal is transmitted. By this means, it is possible to reduce the feedback delay in TDD DL HARQ to 4 ms. Also, since it is possible to reduce the number of transmission acknowledgment signals to feed back in one UL subframe and distribute these signals over a plurality of subframes, even when a base station fails to detect a transmission acknowledgment signal, it is possible to reduce the impact this has on DL HARQ.

Figure 23:
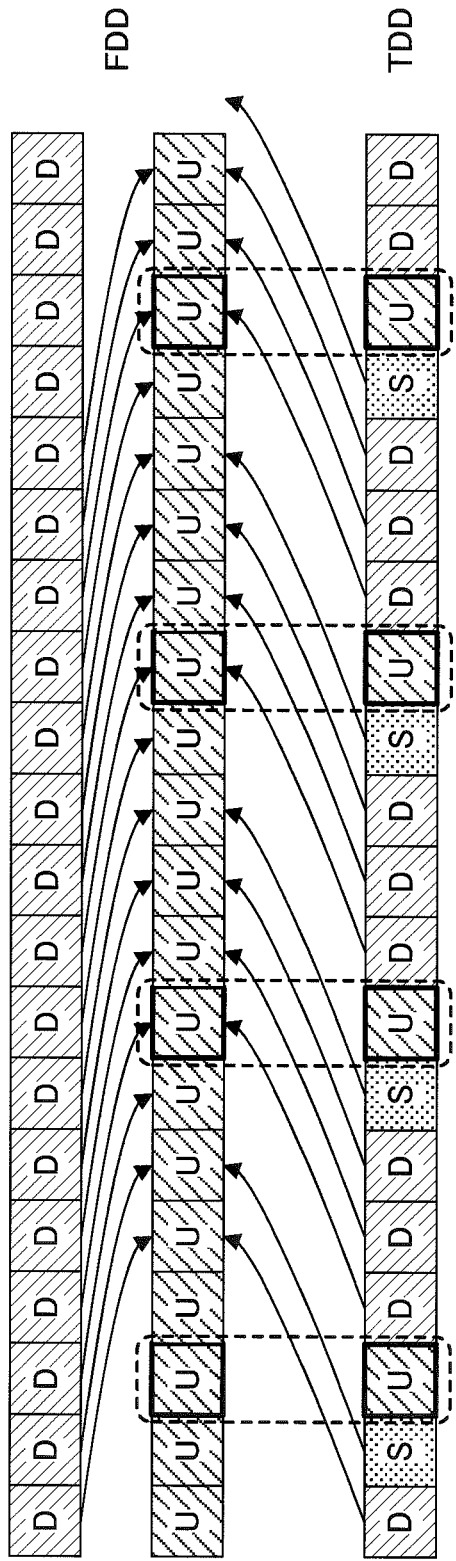
FIG. 23 is a diagram to explain another example of DL HARQ timing that is applicable to the present embodiment in TDD-FDD CA.

Meanwhile, in the case illustrated in FIG. 23, in timings (TDD cell's UL subframes) where both the FDD cell and the TDD cell are directed to UL, in which CC the A/N's should be multiplexed and PUCCH transmission should be carried out is the problem. Also, when channel selection is used in PUCCH transmission, how to execute control (how to determine the type of the table to select in channel selection) is the problem. In this case, it is possible to select the cell to carry out PUCCH transmission by using one of the examples shown with the above embodiment. For example, referring to FIG. 23, in a subframe where the FDD cell and the TDD cell are both directed to UL, cases might occur including the case where PUCCH transmission is carried out only in one cell (the FDD cell or the TDD cell) regardless of the configuration of the primary cell, the case where PUCCH transmission is carried out in the PCell or in the SCell, and the case where PUCCH transmission is carried out in the cell that carries out A/N transmission in this subframes. Furthermore, in each PUCCH transmission, it is possible to employ channel selection by using one of the mechanisms shown with the above embodiment.

(User Terminal Operation)

Now, an example of the operation of user terminals according to the present embodiment will be described below.

First, a user terminal connects with the TDD cell or the FDD cell. Following this, TDD-FDD CA is configured from the NW (for example, the connecting base station) to the user terminal. At this time, the TDD cell's DL/UL configuration is reported to the user terminal via system information (SIB 1) or via higher layer signaling such as RRC and so on. Also, through higher layer signaling such as RRC, the number of CCs and the use of PUCCH format 1b with channel selection are configured. In addition, the PUCCH resource and other parameters are reported at the same time.

Following this, the NW schedules the allocation of the PDSCH in the PCell and the SCell by means of the PDCCH/EPDCCH. The user terminal decodes the PDCCH/EPDCCH, decodes the PDSCHs of the PCell and the SCell, and makes decisions regarding retransmission control (ACKs/NACKs). Then, the user terminal sends feedback by using the PUCCH transmission method in which A/N's that are provided in accordance with the retransmission control decisions are configured (the above first aspect to the fourth example).

(Structure of Radio Communication System)

Now, an example of a radio communication system according to the present embodiment will be described in detail below.

Figure 18:
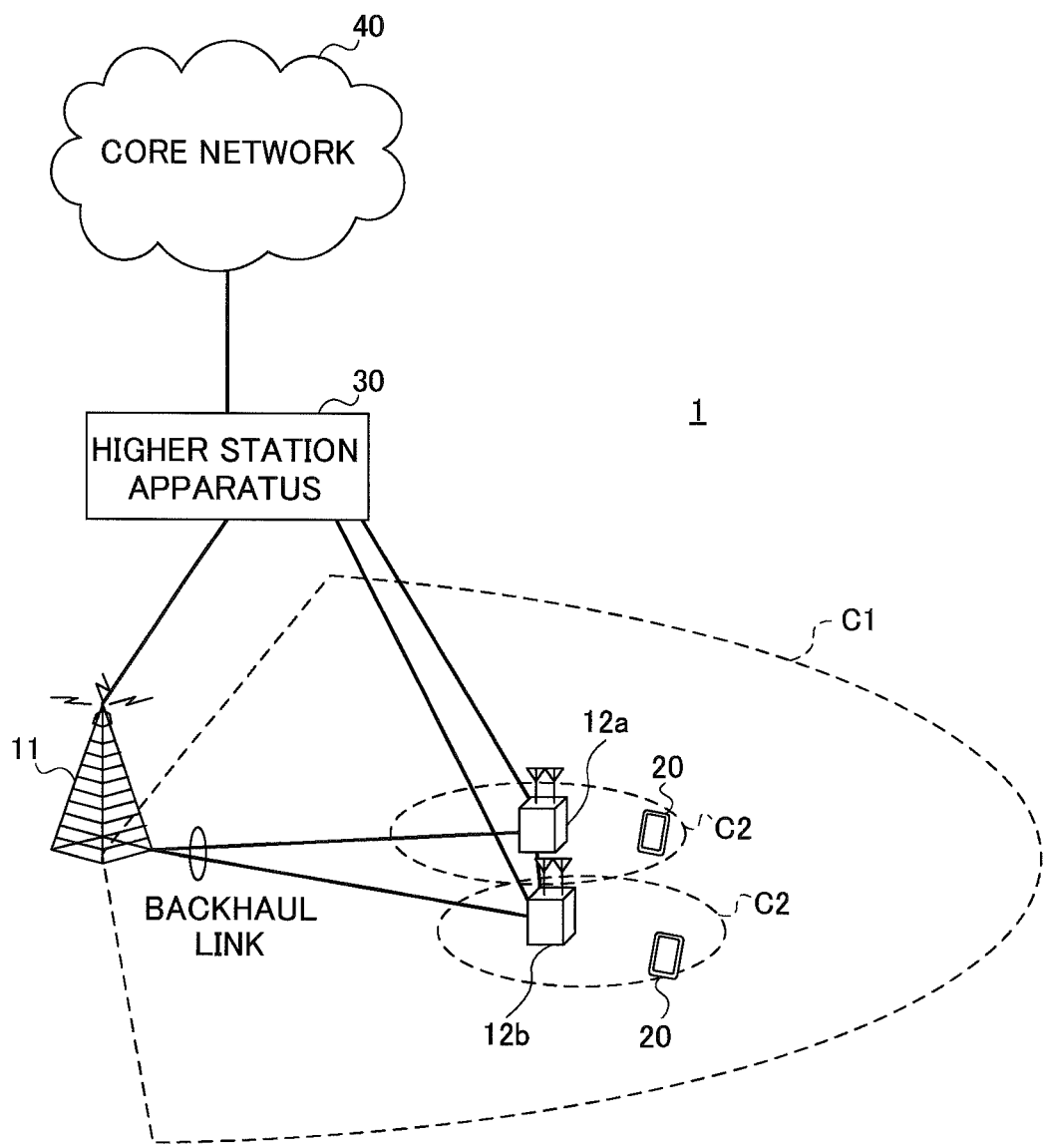
FIG. 18 is a schematic diagram to show an example of a radio communication system according to the present embodiment.

FIG. 18 is a schematic structure diagram of the radio communication system according to the present embodiment. Note that the radio communication system shown in FIG. 18 is a system to incorporate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G," "FRA (Future Radio Access)," etc.

The radio communication system 1 shown in FIG. 18 includes a radio base station 11 that forms a macro cell C1, and radio base stations 12a and 12b that form small cells C2, which are placed inside the macro cell C1 and which are narrower than the macro cell C1. Also, user terminals 20 are placed in the macro cell C1 and in each small cell C2. The user terminals 20 can connect with both the radio base station 11 and the radio base stations 12 (dual connectivity). Also, intra-base station CA (intra-eNB CA) or inter-base station CA (inter-eNB CA) is applied between the radio base station 11 and the radio base stations 12. Furthermore, it is possible that one of the radio base station 11 and the radio base stations 12 employs FDD and the other one employs TDD.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. Hereinafter the radio base stations 11 and 12 will be collectively referred to as "radio base station 10," unless specified otherwise. The user terminals 20 are terminals to support various communication schemes such as LTE, LTE-A and so on, and may be both mobile communication terminals and stationary communication terminals.

In this radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands.

Now, communication channels used in the radio communication system shown in FIG. 18 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use in the PDCCH is transmitted by the PCFICH (Physical Control Format Indicator Channel). HARQ ACKs/NACKs for the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACKs/NACKs and so on are transmitted.

Figure 19:
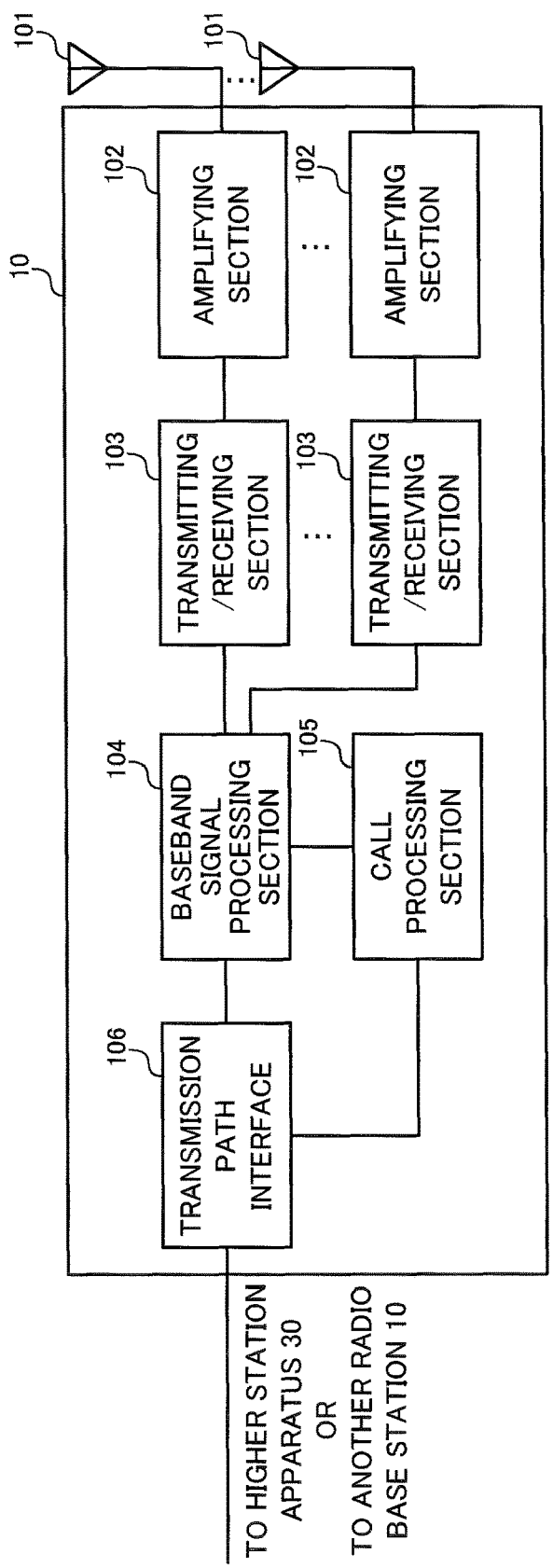
FIG. 19 is a diagram to explain an overall structure of a radio base station according to the present embodiment.

FIG. 19 is a diagram to show an overall structure of a radio base station 10 (which may be either a radio base station 11 or 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminals 20, control information for allowing communication in the cell, through higher layer signaling (RRC signaling, broadcast signal and so on).

The information for allowing communication in the cell includes, for example, the uplink or downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for data to be transmitted from the user terminals 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base stations 10 and manages the radio resources.

Figure 20:
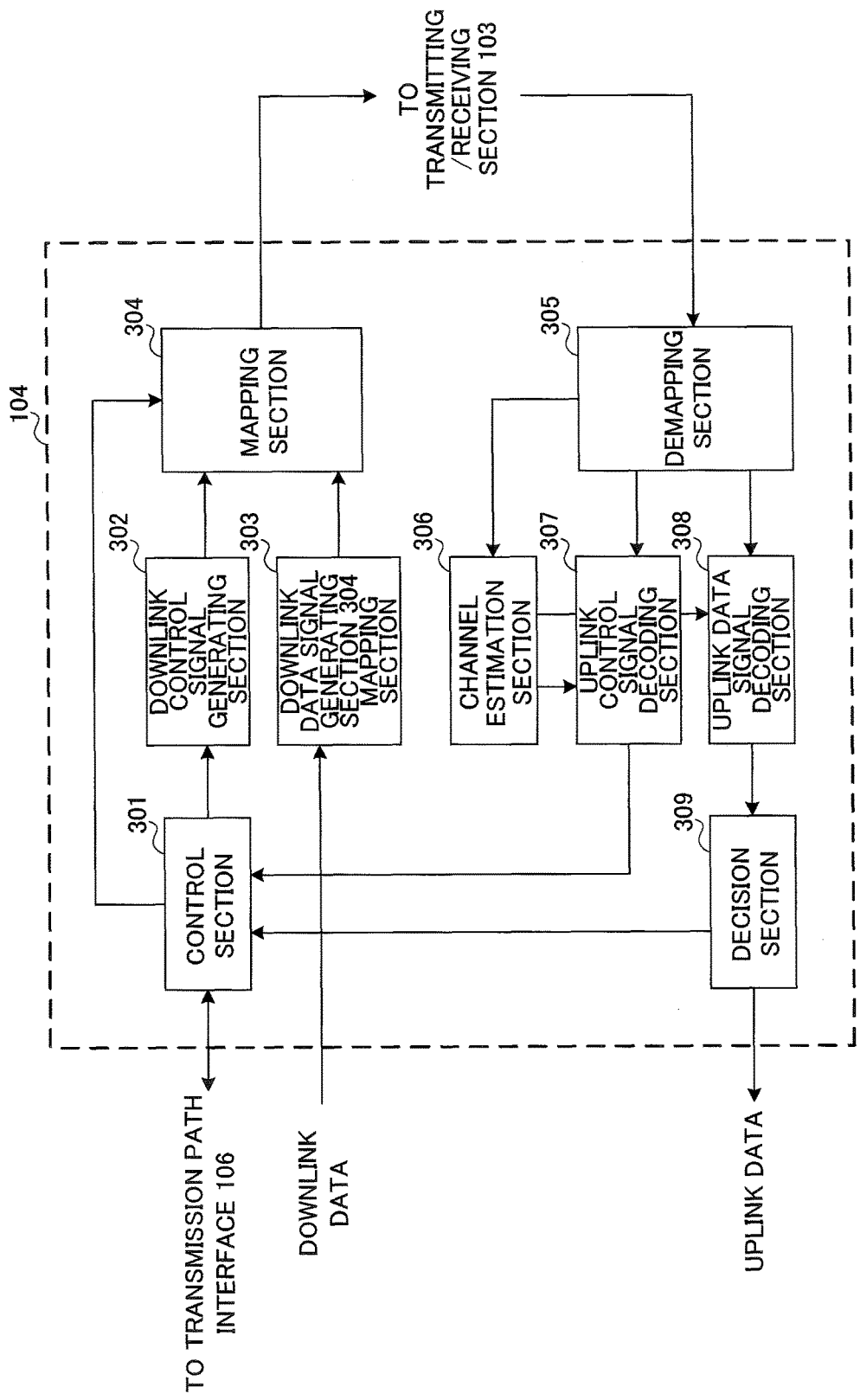
FIG. 20 is a diagram to explain a functional structure of a radio base station according to the present embodiment.

FIG. 20 is a diagram to show a principle functional structure of the baseband signal processing section 104 provided in the radio base station 10 according to the present embodiment. As shown in FIG. 20, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in the PDCCH and/or the enhanced PDCCH (EPDCCH), downlink reference signals and so on. Also, the control section 301 controls the scheduling of uplink data that is transmitted in the PUSCH, uplink control information that is transmitted in the PUCCH or the PUSCH, and uplink reference signals (allocation control). Information about the allocation control of uplink signals (uplink control signals and uplink user data) is reported to user terminals by using a downlink control signal (DCI).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Also, in inter-eNB CA, the control section 301 is provided for each of multiple CCs separately, and, in intra-eNB CA, the control section 301 is provided to be shared by multiple CCs.

The downlink control signal generating section 302 generates downlink control signals (PDCCH signal and/or EPDCCH signal) determined to be allocated by the control section 301. To be more specific, based on commands from the control section 301, the downlink control signal generating section 302 generates a DL assignment to report downlink signal allocation information, and a UL grant to report uplink signal allocation information.

For example, according to the above fourth example, the downlink control signal generating section 302 generates downlink control information with DAI included therein. The downlink control signal generating section 302 can generate a DAI to apply to the PCell and the SCell on a shared basis, included in the SCell's downlink control information. In this case, the control section 301 can make a DL assignment in the TDD cell and a DL assignment in the FDD cell for the user terminal the same (provide DL assignments in the same subframe in the TDD cell and the FDD cell) (see above FIG. 17).

The downlink data signal generating section 303 generates downlink data signals (PDSCH signals). The data signals that are generated in the data signal generating section 303 are subjected to a coding process and a modulation process, based on coding rates and modulation schemes that are determined based on CSI from each user terminal 20 and so on.

Based on commands from the control section 301, the mapping section 304 controls the allocation of the downlink control signals generated in the downlink control signal generating section 302 and the downlink data signals generated in the downlink data signal generating section 303, to radio resources.

The demapping section 305 demaps the uplink signals transmitted from the user terminals and separates the uplink signals. The channel estimation section 306 estimates the channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (transmission acknowledgment signals, etc.) transmitted from the user terminals through an uplink control channel (PUCCH), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (ACK/NACK) based on the decoding results in the uplink data signal decoding section 308, and outputs the results to the control section 301.

Figure 21:
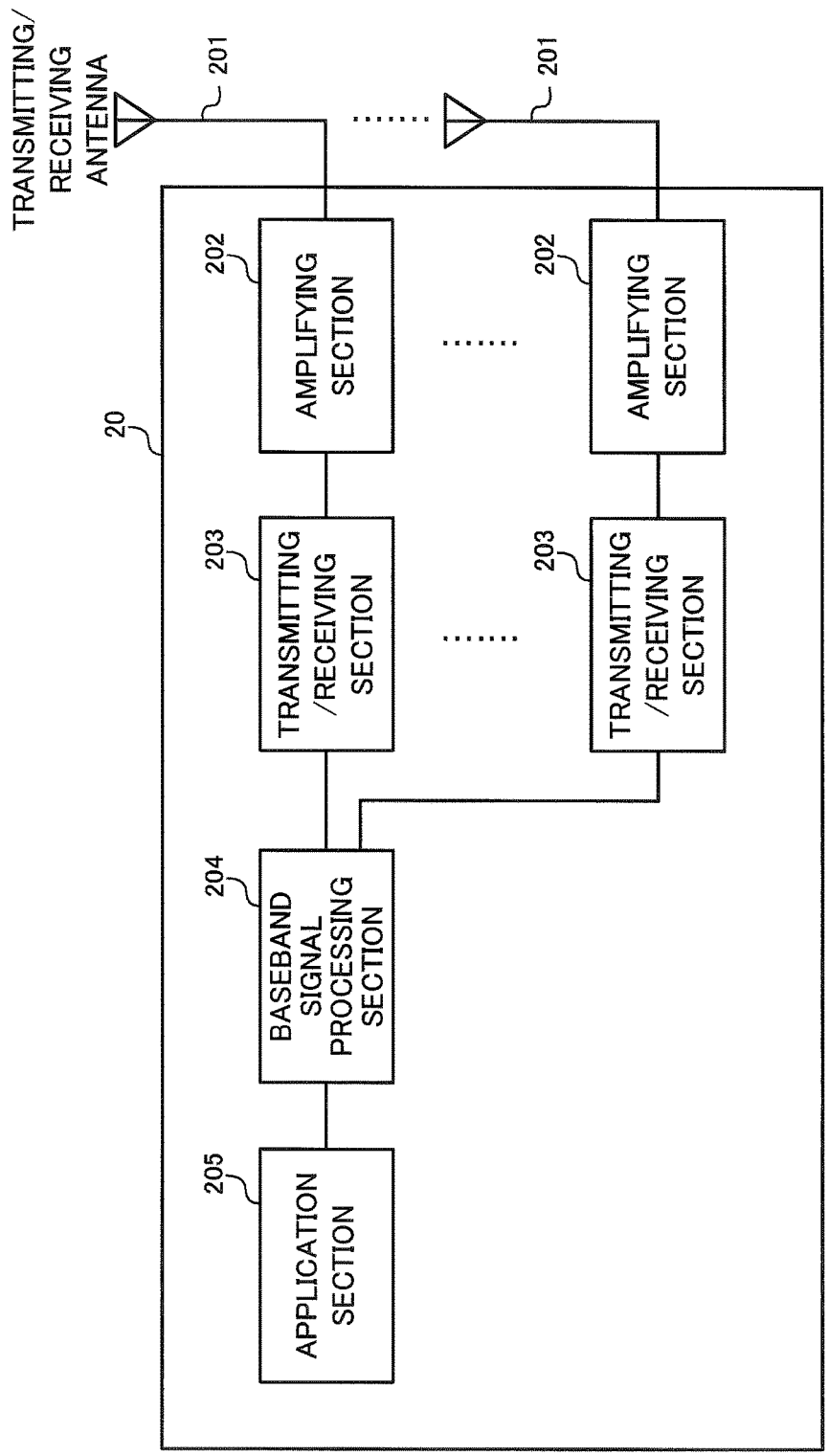
FIG. 21 is a diagram to explain an overall structure of a user terminal according to the present embodiment.

FIG. 21 is a diagram to show an overall structure of a user terminal 20 according to the present embodiment. A user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

Figure 22:
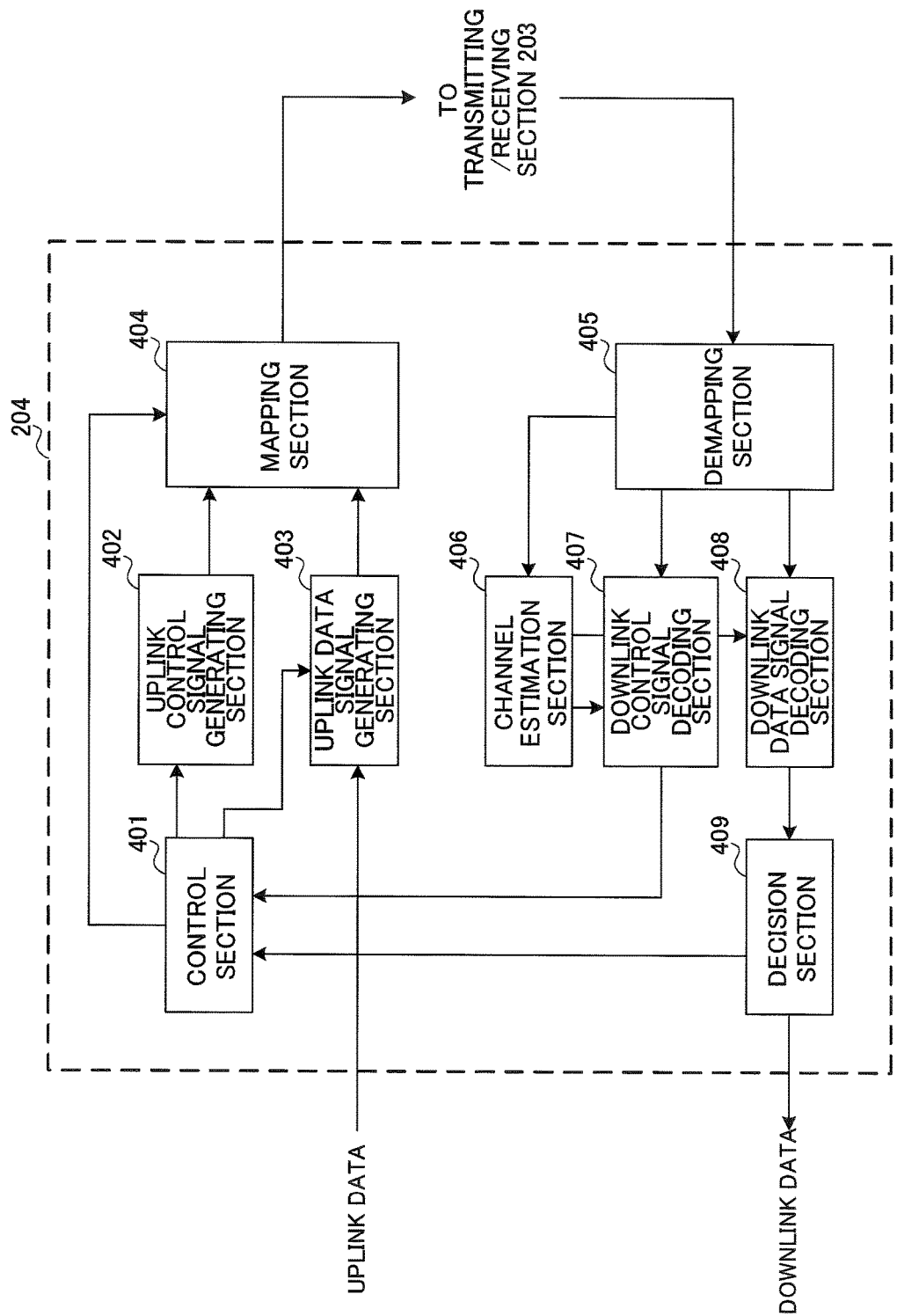
FIG. 22 is a diagram to explain a functional structure of a user terminal according to the present embodiment.

FIG. 22 is a diagram to show a principle functional structure of the baseband signal processing section 204 provided in the user terminal 20. As shown in FIG. 22, the baseband signal processing section 204 provided in the user terminal 20 is comprised at least of a control section 401 (feedback control section), an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (feedback signals) and uplink data signals based on downlink control signals (PDCCH signals) transmitted from the radio base stations, retransmission control decisions with respect to the PDSCH signals received, and so on. The downlink control signals are output from the downlink control signal decoding section 408, and the retransmission control decisions are output from the decision section 409.

Also, the control section 401 also functions as a feedback control section that controls the feedback of transmission acknowledgment signals (ACKs/NACKs) in response to PDSCH signals. To be more specific, in a communication system in which CA is employed, the control section 401 controls the selection of the cell (or CC) to feed back transmission acknowledgment signals, the PUCCH resource to allocate the transmission acknowledgment signals, and so on. For example, based on downlink control signals transmitted from the radio base stations, the control section 401 determines the cell to feed back transmission acknowledgment signals, the PUCCH resource to use and so on, and indicate these to the mapping section 404.

For example, assume a case where, in TDD-FDD CA (intra-eNB CA), A/N's in response to DL signals of both cells are transmitted by using channel selection, with reference to a table in which the states of these A/N's are associated at least with PUCCH resources and QPSK symbol points. Note that the table defines different contents for the FDD cell and the TDD cell.

In this case, regardless of the cell where downlink control information is detected or the cell where downlink shared data is received, the control section 401 can use the table to correspond to the duplex mode of a predetermined cell to transmit A/N's (the above first aspect). Alternatively, regardless of which cell's downlink control information is detected, which cell's downlink shared data is received or which cell's transmission acknowledgment signal is allocated, the control section 401 can use the table that corresponds to the TDD cell (the above second aspect). Alternatively, transmission acknowledgment signals that correspond to a plurality of DL subframes of the TDD cell, respectively, can be made predetermined bits or less in the control section 401 by employing A/N bundling, and multiplexed with the FDD cell's transmission acknowledgment signals (the above third example).

Alternatively, the control section 401 can apply A/N bundling to A/N's corresponding to a plurality of DL subframes of the FDD cell (the above fourth example). At this time, based on the DAI included in the downlink control information, the control section 401 applies A/N bundling to the transmission acknowledgment signals corresponding to a plurality of DL subframes of the FDD cell, respectively.

Furthermore, it is possible to use the DAI included in the TDD cell's downlink control information, for A/N bundling for both the TDD cell and the FDD cell.

The uplink control signal generating section 402 generates uplink control signals (feedback signals such as transmission acknowledgment signals, channel state information (CSI), and so on) based on commands from the control section 401. Also, the uplink data signal generating section 403 generates uplink data signals based on commands from the control section 401. Note that, when a UL grant is included in a downlink control signal reported from the radio base stations, the control section 401 commands the uplink data signal generating section 403 to generate an uplink data signal.

The mapping section 404 (allocation section) controls the allocation of uplink control signals (transmission acknowledgment signals, etc.) and uplink data signals to radio resources (PUCCH and PUSCH) based on commands from the control section 401. For example, depending on the CC (cell) to send feedback (PUCCH transmission), the mapping section 404 allocates the transmission acknowledgment signals to the PUCCH of that CC.

The demapping section 405 demaps a downlink signal transmitted from the radio base station 10 and separates the downlink signal. The channel estimation section 406 estimates the channel state from the reference signals included in the received signal separated in the demapping section 405, and outputs the estimated channel state to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401.

The downlink data signal decoding section 408 decodes the downlink data signal transmitted in the downlink shared channel (PDSCH), and outputs the result to the decision section 409. The decision section 409 makes a retransmission control decision (ACK/NACK) based on the decoding result in the downlink data signal decoding section 408, and also outputs the result to the control section 401.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, a plurality of examples described above may be combined and implemented as appropriate. Consequently, the description herein is provided only for the purpose of explaining examples, and should by no means be construed to limit the present invention in any way.

The disclosure of Japanese Patent Application No. 2013-200353, filed on Sep. 26, 2013, including the specification, drawings and abstract, is incorporated herein by reference in its entirety.

The invention claimed is:

1. A user terminal comprising:
   a transmitting section that transmits a transmission acknowledgement signal for downlink (DL) signals in a plurality of cells of different duplex modes, by using an uplink control channel of a specific cell of the plurality of cells; and
   a control section that determines a PUCCH resource and a QPSK symbol point to use in transmission of the transmission acknowledgement signal, with reference to a table corresponding to the duplex mode of the specific cell,
   wherein the table associates ACK/NACK/DTX states of the DL signals in the plurality of cells with PUCCH resources and QPSK symbol points for each of the different duplex modes.

2. The user terminal according to claim 1, wherein
   the plurality of cells comprises a frequency division duplex (FDD) cell and a time division duplex (TDD) cell, and
   the specific cell is either the FDD cell or the TDD cell.

3. The user terminal according to claim 2, wherein carrier aggregation is applied to communication with the FDD cell and the TDD cell.

4. The user terminal according to claim 3, wherein the control section employs PUCCH format 1b with channel selection.

5. The user terminal according to claim 2, wherein the control section employs PUCCH format 1b with channel selection.

6. The user terminal according to claim 1, wherein the control section employs PUCCH format 1b with channel selection.

7. A base station comprising:
   a receiving section that receives a transmission acknowledgement signal for downlink (DL) signals in a plurality of cells of different duplex modes, by using an uplink control channel of a specific cell of the plurality of cells; and
   a control section that determines a PUCCH resource and a QPSK symbol point to use in transmission of the transmission acknowledgement signal with reference to a table corresponding to the duplex mode of the specific cell,
   wherein the table associates ACK/NACK/DTX states of the DL signals in the plurality of cells with PUCCH resources and QPSK symbol points for each of the different duplex modes.

8. A radio communication method for a user terminal, comprising
   transmitting a transmission acknowledgement signal for downlink (DL) signals in a plurality of cells of different duplex modes, by using an uplink control channel of a specific cell of the plurality of cells; and
   determining a PUCCH resource and a QPSK symbol point to use in transmission of the transmission acknowledgement signal, with reference to a table corresponding to the duplex mode of the specific cell,
   wherein the table associates ACK/NACK/DTX states of the DL signals in the plurality of cells with PUCCH resources and QPSK symbol points for each of the different duplex modes.

* * * * *